Patented Oct. 10, 1922.

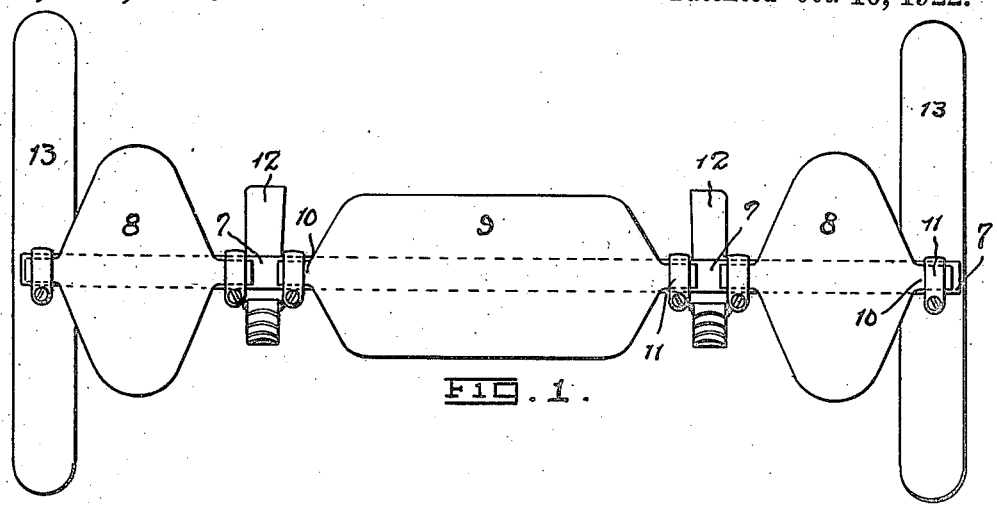
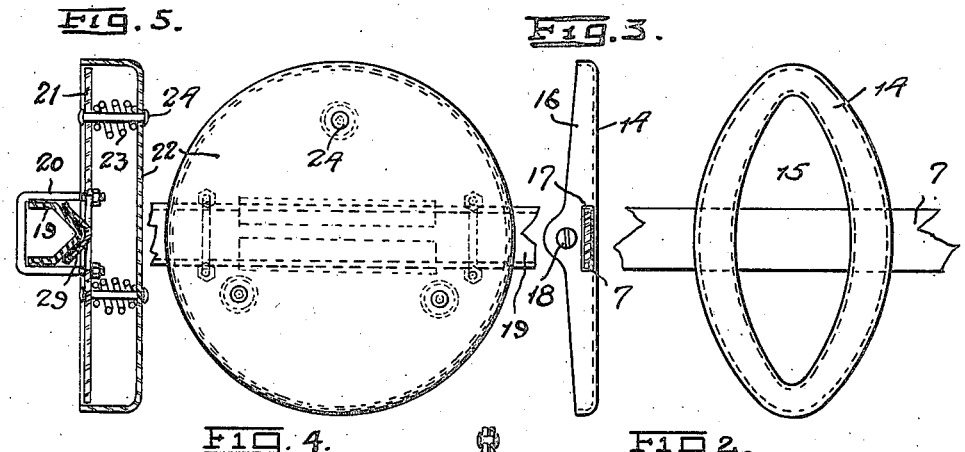
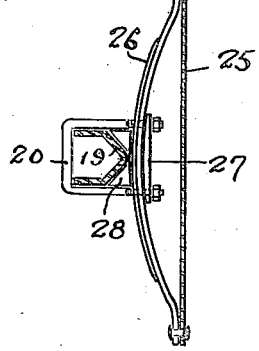

1,431,265

UNITED STATES PATENT OFFICE.

SAMUEL H. SHAW, OF NEW YORK, N. Y.

AUXILIARY IMPACT UNIT FOR AUTOMOBILE BUMPERS.

Application filed March 25, 1921. Serial No. 455,627.

*To all whom it may concern:*

Be it known that I, SAMUEL H. SHAW, a citizen of the United States of America, residing at New York city, in the county of New York and State of New York, have invented certain new and useful Improvements in Auxiliary Impact Units for Automobile Bumpers, of which the following is a specification.

My invention relates to attachments for automobile bumpers, and particularly to auxiliary impact units adapted to be mounted upon automobile bumpers to increase the vertical range of their impact members.

The bumpers in general use today, whether of the resilient or rigid impact bar type, are commonly of very slight vertical extent—say from 1¾ to 2½ inches. While a bumper of this type protects as well as possible against a vertical obstruction, such as a post or pole, it is of little value as protection against a horizontal obstruction which does not lie in the plane of the impact element of the bumper. For example, in street traffic where 80 per cent of all collisions occur, unless the bumpers of two colliding cars are in the same horizontal plane, practically no protection against injury to fenders and lamps is afforded thereby. Since these bumpers are ordinarily mounted on the chassis side bars, and the latter are at different heights from the ground, not only owing to different constructions of the chassis of different cars, but to different wheel diameters, it is seldom the case that the bumpers of two cars lie in precisely the same horizontal plane. To meet this difficulty, I now provide auxiliary impact units which may be readily mounted on the usual bumper, and will serve to increase the vertical range of the latter and thus increase the protection afforded thereby. Just what shape may be given to this auxiliary unit, or the particular fastening means for securing the unit to the bumper, are subsidiary details of the invention, the underlying thought being to provide an auxiliary impact unit mountable on a standard bumper, and having the effect of increasing the vertical range of the latter.

A second feature of my invention resides in the location of the increased impact area. Certain bumpers have recently appeared on the market which afford an impact area of greater vertical extent in the mid-area of the bumper. While this is effective in case of a head-on collision, it is of practically no value where the collision takes place with vehicles meeting each other at a material angle, such as occurs for instance when a car is driven out from the curb. A large percentage of accidents to fenders and lamps occurs under just these conditions, and the bumper above mentioned, with increased impact extent in its mid-area, does not take care of this condition. My thought is to provide auxiliary impact units which are preferably mounted on the bumper in such manner as to afford an increased vertical range at the opposite ends thereof—that is to say outboard of the chassis side bars, and in the vicinity of the fenders and lamps.

Some of the various possible embodiments of my invention are indicated in the accompanying drawings, in which Fig. 1 is a front elevation of a bumper of the spring strap type, to which auxiliary impact units embodying my invention in one form are secured;

Figs. 2 and 3 are respectively front and side elevations of modified forms of the impact units;

Fig. 4 is a front elevation of another modified embodiment of the invention;

Fig. 5 is a vertical section therethrough; and

Fig. 6 is a vertical section through a further modified embodiment of my invention.

The present auxiliary impact units may be applied to bumper bars of various types, that shown in Fig. 1 being of the usual spring strap type 7, also illustrated in Figs. 2 and 3. The auxiliary impact units shown in this figure comprise sheet metal plates 8 and 9, the latter being of different outline from the end units 8. These units may all be blanked to any desired shape, preferably having in each case end tongues 10, by which the units may be secured to the bumper 7, in front of which they are arranged, by means of stirrup clamps 11. As will be noted, the units 8 are arranged outboard of the chassis side bars 12, and extend therefrom to a position substantially in front of the wheels 13, so as to afford an extended impact area in the region of the lamps, and wheel fenders (not shown). The unit 9, which is located in the area defined by the chassis side bars, extends the vertical range of the bumper in the area of the usual engine radiator, and affords greater protection to the latter than the conventional bumper 7 alone.

In Figs. 2 and 3, I have shown a modified form of the end impact unit 14, which may also be blanked from sheet metal. In this construction, the unit is lighter than that first shown by reason of its central cut-out space 15, but is made sufficiently strong to withstand impact strains by reason of the channel construction afforded by the offset flanges 16. These flanges are apertured at 17 to permit the bumper 7 to pass therethrough, while the unit is held in position by cramping bolts 18 passing through the flanges 16 at the rear of the bumper 7. While a unit of this type is preferably arranged at each end of the bumper 7, one or more units may be also positioned in the mid-area of the latter in place of a unit such as 9, shown in Fig. 1.

In Fig. 4 I have shown a further modification which may be applied, for instance, to a bar 19 of the rigid channel type. This unit also embodies the further feature of self contained resiliency, thus the unit is secured to the bar 19 by means of stirrup bolts 20 engaging the back plate 21, which is preferably rigid. Associated with the latter is a cup-shaped impact element 22, spaced from the plate 21 by coil springs 23 surrounding the supporting rivets or bolts 24. The margins of the cup 22 embrace the edges of the plate 21, so that upon impact the cup is driven inward toward the plate, thus compressing the springs 23 and cushioning the shock transmitted to the bumper 19.

The same idea of a cushioned impact unit for attachment to a bumper of the rigid bar type is shown in Fig. 6, in which the unit comprises an impact plate or disk 25 supported by a leaf spring or springs 26, which are attached to the bumper 19 by stirrup bolts 20, and the bridge plate 27.

The resilient impact units of Figs. 4, 5 and 6 may of course be mounted upon a spring bar type of bumper 7, if desired, by suitably modifying the attaching devices. Where the rigid bar type is used, however, it is desirable to secure a flat bearing for the unit by inserting suitable bearing blocks 28 between the front of the impact bar and the unit, or to provide an equivalent steadying saddle by striking out lugs from the plate 21, as indicated at 29 in Fig. 5.

Various other modifications of construction will readily occur to those dealing with the problem, without departing from what I claim as my invention.

The present application is in part a division, and in part a continuation of my co-pending application Ser. No. 448,508 filed February 28, 1921.

I claim—

1. An auxiliary impact unit for automobile bumpers, said unit comprising a sheet metal member having a vertical extent greater than the impact bar of the bumper to which it is attached, and having a transverse extent materially less than the transverse extent of the bumper, together with means for mounting said unit upon the latter.

2. An auxiliary impact unit for automobile bumpers, comprising an impact member of greater vertical extent than the impact member of the bumper, and extending both above and below the latter in adjusted position, said unit having a transverse extent materially less than the transverse extent of the bumper, together with means for mounting said auxiliary unit in front of the bumper upon the impact element thereof.

3. An automobile bumper comprising an impact member, and independent impact units of greater vertical range than said impact member and located at different areas of the bumper to increase the vertical range of the latter at transversely spaced points thereon.

4. An automobile bumper comprising an impact member, and auxiliary impact units of greater vertical range than said impact member, and mounted upon the latter adjacent the opposite ends of the latter, each of said units being independent of the other and being transversely spaced apart on said impact member.

5. An automobile bumper comprising an impact member, and auxiliary impact units of greater vertical range than said impact member, and mounted upon the latter adjacent the opposite ends of the latter, each of said units being independent of the other and being transversely spaced apart on said impact member, together with an additional impact unit mounted on said bumper intermediate said end units.

In testimony whereof I have signed my name to this specification.

SAMUEL H. SHAW.